(12) United States Patent
Avrutsky et al.

(10) Patent No.: US 8,058,747 B2
(45) Date of Patent: Nov. 15, 2011

(54) SYSTEMS TO CONNECT MULTIPLE DIRECT CURRENT ENERGY SOURCES TO AN ALTERNATING CURRENT SYSTEM

(75) Inventors: Mordechay Avrutsky, Alphai Menashe (IL); Ron Hadar, Cupertino, CA (US); Shmuel Arditi, Los Gatos, CA (US)

(73) Assignee: Tigo Energy, Inc., Los Gatos, CA (US)

( * ) Notice: Subject to any disclaimer, the term of this patent is extended or adjusted under 35 U.S.C. 154(b) by 115 days.

(21) Appl. No.: 12/340,540

(22) Filed: Dec. 19, 2008

(65) Prior Publication Data

US 2010/0026097 A1     Feb. 4, 2010

Related U.S. Application Data

(60) Provisional application No. 61/137,741, filed on Aug. 1, 2008.

(51) Int. Cl.
*H02J 1/10* (2006.01)
(52) U.S. Cl. .......................................................... 307/43
(58) Field of Classification Search .............. 307/43–46; 363/74, 13, 65, 71
See application file for complete search history.

(56) References Cited

U.S. PATENT DOCUMENTS

| | | | |
|---|---|---|---|
| 4,649,334 A | 3/1987 | Nakajima | |
| 5,235,266 A | 8/1993 | Schaffrin | |
| 5,268,832 A | 12/1993 | Kandatsu | |
| 5,504,418 A | 4/1996 | Ashley | |
| 5,604,430 A | 2/1997 | Decker et al. | |
| 5,648,731 A | 7/1997 | Decker et al. | |
| 5,892,354 A | 4/1999 | Nagao et al. | |
| 5,923,158 A | 7/1999 | Kurokami et al. | |
| 5,929,614 A | 7/1999 | Copple | |
| 6,175,219 B1 | 1/2001 | Imamura et al. | |
| 6,262,558 B1 | 7/2001 | Weinberh | |
| 6,275,016 B1 | 8/2001 | Ivanov | |
| 6,281,485 B1 | 8/2001 | Siri | |
| 6,369,462 B1 | 4/2002 | Siri | |
| 6,448,489 B2 | 9/2002 | Kimura et al. | |
| 6,590,793 B1 | 7/2003 | Nagao et al. | |
| 6,650,031 B1 | 11/2003 | Goldack | |

(Continued)

FOREIGN PATENT DOCUMENTS

AU     2005262278     7/2005

(Continued)

OTHER PUBLICATIONS

Wikimedia Foundation, Inc., "Electric Power Transmission," located at http://web.archive.org/web/20041210095723/en.wikipedia.org/wiki/Electric_power_transmission, Nov. 17, 2004.

(Continued)

*Primary Examiner* — Albert W Paladini
(74) *Attorney, Agent, or Firm* — Greenberg Traurig, LLP

(57) ABSTRACT

High voltage direct current systems to connect direct current energy sources to an alternating current system. In one aspect, a system includes a plurality of direct current modules having variable direct current inputs; an inverter; and a direct current bus to connect the direct current modules to the inverter, where the bus is configured to operate at a nominal voltage higher than 100 volts and to operate within 10 percent of the nominal operating voltage.

20 Claims, 8 Drawing Sheets

U.S. PATENT DOCUMENTS

| | | | |
|---|---|---|---|
| 6,765,315 | B2 | 7/2004 | Hammerstrom et al. |
| 6,810,339 | B2 | 10/2004 | Wills |
| 6,844,739 | B2 | 1/2005 | Kasai et al. |
| 6,894,911 | B2 | 5/2005 | Telefus et al. |
| 6,914,418 | B2 | 7/2005 | Sung |
| 6,966,184 | B2 | 11/2005 | Toyomura et al. |
| 6,984,970 | B2 | 1/2006 | Capel |
| 7,061,214 | B2 | 6/2006 | Mayega |
| 7,126,053 | B2 | 10/2006 | Kurokami et al. |
| 7,150,938 | B2 | 12/2006 | Munshi et al. |
| 7,158,395 | B2 | 1/2007 | Deng et al. |
| 7,248,946 | B2 | 7/2007 | Bashaw et al. |
| 7,256,566 | B2 | 8/2007 | Bhavaraju et al. |
| 7,276,886 | B2 | 10/2007 | Kinder |
| 7,324,361 | B2 | 1/2008 | Siri |
| 7,432,691 | B2 | 10/2008 | Cutler |
| 7,456,523 | B2 | 11/2008 | Kobayashi |
| 7,518,346 | B2 | 4/2009 | Prexl |
| 7,538,451 | B2 | 5/2009 | Nomoto |
| 7,595,616 | B2 | 9/2009 | Prexl |
| 7,605,498 | B2 | 10/2009 | Ledenev et al. |
| 7,629,708 | B1 * | 12/2009 | Meyers et al. ................. 307/66 |
| 7,709,727 | B2 * | 5/2010 | Roehrig et al. ............... 136/243 |
| 7,719,140 | B2 | 5/2010 | Ledenev et al. |
| 7,768,244 | B2 * | 8/2010 | Perol ............................ 323/234 |
| 7,778,056 | B2 | 8/2010 | Geissler |
| 2003/0156439 | A1 | 8/2003 | Ohmichi |
| 2004/0207366 | A1 | 10/2004 | Sung |
| 2005/0041442 | A1 | 2/2005 | Balakrishnan |
| 2005/0057214 | A1 | 3/2005 | Matan |
| 2005/0057215 | A1 | 3/2005 | Matan |
| 2005/0162018 | A1 | 7/2005 | Realmuto et al. |
| 2005/0172995 | A1 | 8/2005 | Rohrig et al. |
| 2005/0213272 | A1 | 9/2005 | Kobayashi |
| 2005/0275386 | A1 | 12/2005 | Jepsen et al. |
| 2006/0001406 | A1 | 1/2006 | Matan |
| 2006/0017327 | A1 | 1/2006 | Siri et al. |
| 2006/0174939 | A1 | 8/2006 | Matan |
| 2006/0176031 | A1 | 8/2006 | Forman |
| 2006/0185727 | A1 | 8/2006 | Matan |
| 2007/0024257 | A1 | 2/2007 | Boldo |
| 2007/0044837 | A1 | 3/2007 | Simburger et al. |
| 2007/0103108 | A1 | 5/2007 | Capp et al. |
| 2007/0133241 | A1 | 6/2007 | Mumtaz et al. |
| 2007/0164612 | A1 * | 7/2007 | Wendt et al. |
| 2007/0273351 | A1 | 11/2007 | Matan |
| 2008/0036440 | A1 | 2/2008 | Garmer |
| 2008/0097655 | A1 | 4/2008 | Hadar et al. |
| 2008/0121272 | A1 | 5/2008 | Besser et al. |
| 2008/0122449 | A1 | 5/2008 | Besser et al. |
| 2008/0122518 | A1 | 5/2008 | Besser et al. |
| 2008/0143188 | A1 | 6/2008 | Adest et al. |
| 2008/0147335 | A1 | 6/2008 | Adest et al. |
| 2008/0150366 | A1 | 6/2008 | Adest et al. |
| 2008/0150484 | A1 | 6/2008 | Kimball et al. |
| 2008/0164766 | A1 | 7/2008 | Adest et al. |
| 2008/0179949 | A1 | 7/2008 | Besser et al. |
| 2008/0191560 | A1 | 8/2008 | Besser et al. |
| 2008/0191675 | A1 | 8/2008 | Besser et al. |
| 2008/0303503 | A1 | 12/2008 | Wolfs |
| 2009/0069950 | A1 | 3/2009 | Kurokami et al. |
| 2009/0150005 | A1 | 6/2009 | Hadar et al. |
| 2010/0027297 | A1 | 2/2010 | Avrutsky |

FOREIGN PATENT DOCUMENTS

| | | |
|---|---|---|
| DE | 4232356 | 3/1994 |
| DE | 19961705 | 7/2001 |
| EP | 1388774 | 2/2004 |
| ES | 2249147 | 3/2006 |
| JP | 2003102134 | 4/2003 |
| KR | 20080065817 | 7/2008 |
| WO | 03012569 | 2/2003 |

OTHER PUBLICATIONS

Palma, L et al., "A Modular Fuel Cell, Modular DC-DC Converter Concept for High Performance and Enhanced Reliability," 38th IEEE Power Electronics Specialists Conference (PESC'07), pp. 2633-2638, Jun. 17, 2007.

Quaschning, V. et al., "Cost Effectiveness of Shadow Tolerant Photovoltaic Systems," Euronsun 96, pp. 819-824, Sep. 16, 1996.

Uriarte, S. et al., "Energy Integrated Management System for PV Applications," 20th European Photovoltaic Solar Energy Conference, Jun. 6, 2005.

Walker, G. R. et al., "Cascaded DC-DC Converter Connection of Photovoltaic Modules," 33rd IEEE Power Electronics Specialists Conference (PESC'02), vol. 1, pp. 24-29, 2002.

Alonso, R. et al., "A New Distributed Converter Interface for PV Panels," 20th European Photovoltaic Solar Energy Conference, Barcelona, Spain, pp. 2288-2291, Jun. 6-10, 2005.

Alonso, R. et al., "Experimental Results of Intelligent PV Module for Grid-Connected PV Systems," 21st European Photovoltaic Solar Energy Conference, Dresden, Germany, pp. 2297-2300, Sep. 4-8, 2006.

Enslin, Johan H.R., et al., "Integrated Photovoltaic Maximum Power Point Tracking Converter," IEEE Transactions on Industrial Electronics, vol. 44, No. 6, pp. 769-773, Dec. 1997.

Roman, Eduardo, et al., "Intelligent PV Module for Grid-Connectred PV Systems," IEEE Transactions on Industrial Electronics, vol. 53, No. 4, pp. 1066-1073, Aug. 2006.

Walker, Jeffrey R. et al., "Cascaded DC-DC Converter Connection of Photovoltaic Modules," IEEE Transactions on Power Electronics, vol. 19, No. 4, pp. 1130-1139, Jul. 2004.

Basso, Tim, "IEEE Standard for Interrconnecting Distributed Resources With the Electric Power System," IEEE PES Meeting, Jun. 9, 2004.

Boostbuck.com, "The Four Boostbuck Topologies," located at http://www.boostbuck.com/TheFourTopologies.html, 2003.

Gautam, Nalin K. et al., "An Efficient Algorithm to Simulate the Electrical Performance of Solar Photovoltaic Arrays," Energy, vol. 27, No. 4, pp. 347-361, 2002.

International Patent Application PCT/US08/75127, International Search Report and Written Opinion (mailed Apr. 28, 2009).

Nordmann, T. et al., "Performance of PV Systems Under Real Conditions," European Workshop on Life Cycle Analysis and Recycling of Solar Modules, The "Waste" Challenge, Brussels, Belgium, Mar. 18-19, 2004.

Linares, Leonor et al., "Improved Energy Capture in Series String Photovoltaics via Smart Distributed Power Electronics," 24th Annual IEEE Applied Power Electronics Conference and Exposition, pp. 904-910, Feb. 15, 2009.

Baek, Ju-Won et al., "High Boost Converter using Voltage Multiplier," 2005 IEEE Conference, IECON 05, pp. 567-572, Nov. 2005.

Transaction History of related U.S. Appl. No. 1/875,799, filed Oct. 19, 2007, entitled "Method and System to Provide a Distributed Local Energy Production System and High-Voltage DC Bus."

Transaction History of related U.S. Appl. No. 12/392,042, filed Feb. 24, 2009, entitled "Method and System to Provide a Distributed Local Energy Production System and High-Voltage DC Bus."

Transaction History of related U.S. Appl. No. 12/202,110, filed Aug. 29, 2008, entitled "Step-Up Converter Systems and Methods."

Philips Electronics, N.V., "Data Sheet: PSMN005-55B; PSMN005-55P: N-channel logic level TrenchMOS(TM) transistor," product specification, Oct. 1999.

\* cited by examiner

SYSTEMS TO CONNECT MULTIPLE DIRECT CURRENT ENERGY SOURCES TO AN ALTERNATING CURRENT SYSTEM

RELATED APPLICATIONS

The present application claims priority to provisional U.S. patent application Ser. No. 61/137,741, filed on Aug. 1, 2008 and entitled "Method and System of New Topology for Enhanced Ultra-Low-Cost, High-Efficiency, DC-to-DC Step-Up Converter," the disclosure of which is hereby incorporated herein by reference.

The present application is related to U.S. patent application Ser. No. 12/202,110, filed Aug. 29, 2008 and entitled "Step-Up Converter Systems and Methods," and U.S. patent application Ser. No. 11/875,799, filed Oct. 19, 2007 and entitled "Method and System to Provide a Distributed Local Energy Production System with High-Voltage DC Bus." The disclosures of these related patent applications are hereby incorporated herein by reference.

FIELD OF THE TECHNOLOGY

At least some embodiments disclosed herein relate to systems to connect direct current energy sources, such as solar panels, fuel cells, etc., to an alternating current system, such as a power grid.

BACKGROUND

Solar panels and other kinds of energy sources produce variable voltages, which, depending on the type of panel, may range anywhere from 10 to 100 volts (or even higher in some instances). It is known to the inventors that there are efforts to combine solar panels with a high-voltage bus (e.g., in the 200 to 600 volt range), which may be implemented via step-up converters that have an output voltage larger than its input voltage.

A discussion of some current DC-to-DC converter topologies can be found on the web site http://www.boostbuck.com/, which includes discussions of boost-buck switching converter, Cuk Converter, Coupled Inductor Cuk Converter, and Integrated Magnetics Cuk Converter. Other topologies for direct current voltage conversion include boost converter, buck converter, flyback converter, etc.

A boost converter typically includes at least two switches, such as a diode and a transistor, and at least one energy storage element, such as an inductor. The transistor is used to periodically connect the energy source directly to the energy storage element to store energy into the energy storage element; and the energy storage element causes the converter to output a voltage higher than its input DC voltage. Filters made of capacitors can be added to the output of the converter to reduce changes in its output voltage. The diode prevents the electric current in the output from flowing backwards.

However, one of the problems with existing direct current to direct current (DC-to-DC) converters is that in some cases their low efficiency may erase a good part of the gains made by using a high-voltage bus.

In a prior high-voltage system bus known to the inventors, inverters connected to photovoltaic systems operate in a wide input voltage range, such as between 250V to 600V or between 300V to 1000V, allowing for variations of the solar energy available and the resulting voltage swings. Operating a DC-to-AC inverter over such a wide range of input voltage reduces its efficiency and increases its cost.

SUMMARY OF THE DESCRIPTION

High voltage direct current systems to connect direct current energy sources to an alternating current system are described herein. Some embodiments are summarized in this section.

In one aspect, a system includes a plurality of direct current modules having variable direct current inputs; an inverter; and a direct current bus to connect the direct current modules to the inverter, where the bus is configured to operate at a nominal voltage higher than 100 volts and to operate within 10 percent of the nominal operating voltage.

In one embodiment, each of the direct current modules includes a controller to control a voltage output to the bus.

In one embodiment, the system may further includes a management module coupled to the bus and the plurality of direct current modules. The management module is configured to communicate with the direct current modules to control a voltage on the bus. The management module may be further coupled to the inverter to control the voltage on the bus. Alternatively, or in combination, the management module can be further connected to a web site to receive instructions to control the voltage on the bus.

In one embodiment, the direct current modules are coupled with photovoltaic panels to increase output voltages from the photovoltaic panels. The inverter is coupled to a power grid.

In one embodiment, the inverter has a Zener characteristic to represent a shunt regulator toward the bus.

In one embodiment, the direct current modules are connected to the bus in a daisy chain. In one embodiment, the direct current modules are connected to a vicinity of the inverter in a star form for connection to the inverter.

In one embodiment, each of the direct current modules includes a step up converter which has: a boost converter having a first inductor; a second inductor paired on a core with the first inductor; and a half bridge rectifier circuit coupled with the second inductor to generate a direct current output to the bus.

In one embodiment, the boost converter further includes a transistor to implement a switch in the boost converter and a controller coupled to the transistor to control the switch to adjust an output voltage of the step up converter.

In one embodiment, the boost converter provides a first portion of a voltage output of the step-up converter; and the rectifier circuit provides a second portion of the voltage output of the step-up converter. The outputs of the boost converter and the rectifier circuit are connected in serial to drive the bus.

In one embodiment, the first portion and the second portion of the voltage output of the step-up convert are proportional to a ratio between the first inductor and the second inductor.

In one embodiment, the boost converter further includes a transistor to implement a switch in the boost converter; the voltage output of the step-up converter is higher than 100 volts; and the transistor has a breakdown voltage lower than 100 volts.

In one embodiment, the resistance between drain source connection in the transistor is less than ten milliohms when the transistor is in a saturated on mode.

In one aspect, a energy system includes: a direct current bus; a plurality of photovoltaic panels; a plurality of direct current modules coupled between the plurality of photovoltaic panels and the bus; and an inverter coupled between the bus and a power grid, wherein the bus is configured to operate at a voltage higher than 200 voltages and to operate within 4 percent of a nominal voltage of the bus even when a current supplied by the photovoltaic panels is reduced to a level to power the inverter without substantial output to the power grid.

In one embodiment, the inverter has a characteristic that resembles a Zener diode.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In one embodiment, a system is provided to combine an inverter or converter with high-efficiency DC-to-DC modules to deliver a stable voltage on a high voltage bus, thus a stable input voltage for the inverter, even through the energy and voltage supplied by the direct current energy sources, such as photovoltaic panels, may vary in a wide range. The stable voltage on the bus allows the system to run more efficiently and also to reduce the cost of the inverter.

Figure 1:
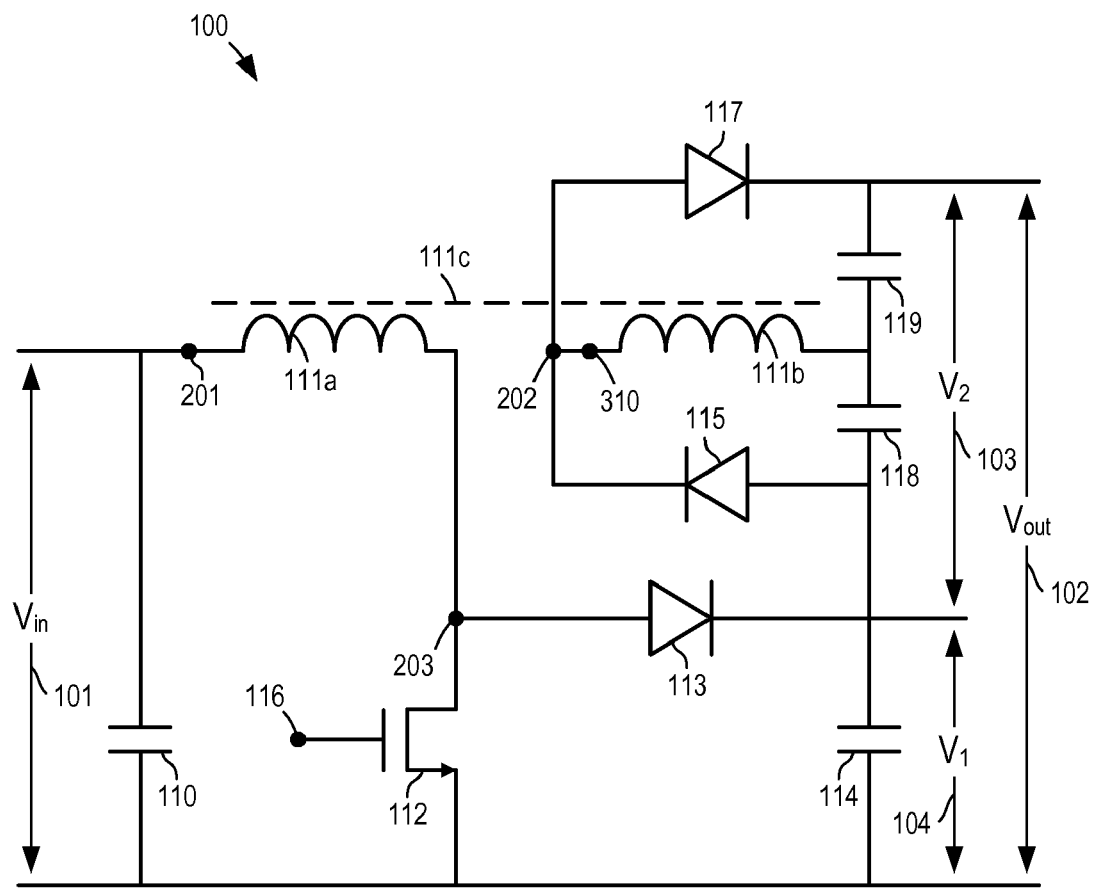
FIG. 1 shows a converter according to one embodiment.

FIG. 1 shows a converter according to one embodiment. As opposed to other technologies, such as the boostbuck or other similar technologies, the converter 100 illustrated in FIG. 1 has significant advantages, which will be discussed below.

In FIG. 1, the step-up converter 100 includes a boost converter section, including an inductor 111a, a transistor 112, and a diode 113. The booster converter section applies a regular, typical boost converter approach to generate the voltage 104, $V_1$, which is higher than the input voltage 101, $V_{in}$, of the step-up converter.

In the boost converter section, the transistor 112 is controlled by the control voltage 116 to periodically connect the inductor 111a to the input voltage $V_{in}$ to store energy into the inductor and to disconnect the inductor 111a from the input voltage $V_{in}$ to release energy and thus power the output. When the transistor 112 is in on mode, energy is stored into the inductor 111a to increase the electric current in the inductor 111a; when the transistor 112 is in off mode, energy is released from the inductor 111a to direct the electric current to the output via the diode 113. The diode 113 is used to create a rectified output voltage $V_1$.

In FIG. 1, capacitors 110 and 114 are used as filters in the input and output portions of the boost converter section to reduce voltage changes.

In one embodiment, the voltage $V_1$ of the output of the booster converter section is typically kept at 50 volts or below, allowing the use of a very highly efficient transistor 112 that has low resistance between drain source connection when the transistor 112 is in saturated on mode (i.e., low RDS-on), such as trench transistors.

In the 50-volt or below operational range, the transistor 112 may typically have a breakdown voltage of 75V-100V and very few milliohms of RDS-on (resistance between drain source connection when the transistor is running in saturated on mode). This low ratio between breakdown voltage and operation voltage is due in large part to the clean waveforms produced by the design of the converter 100 and the resulting low spikes or ringing associated with it.

However, the boost converter section alone, having a very typical design, may result in lots of noise on the output voltage $V_1$ and also in some cases considerable noise on the input voltage $V_{in}$.

Further, to produce an output voltage above 50 volts using the booster converter section along, a high-voltage type of transistor would be used to implement the transistor 112. However, high-voltage transistors are expensive and have high RDS-on.

Once the breakdown voltage of the transistor 112 voltage exceeds 100 volts, the RDS-on is in the high 10s or even 100s of milliohms, affecting the efficiency dramatically. For example, when the power to be converted is in the high 10s or low 100s of watts, the electric currents can exceed 10 amps. Increasing the RDS-on from a few milliohms to a few hundred milliohms can therefore increase losses by 10 times or more for the converter.

Further, high voltage peaks require additional components, such as snubbing networks, diodes, and other components to protect the circuitry and reduce noise, all of which result in additional energy losses in the circuitry.

In FIG. 1, another inductor 111b is connected to a half bridge rectifier circuit to generate another rectified output voltage $V_2$. The inductor 111a and the inductor 111b are paired on the same core 111c, which has a slight air gap in one embodiment, to transfer energy via inductive coupling. The half bridge rectifier circuit includes diodes 115 and 117 and capacitors 118 and 119 to provide a multiplier voltage from the energy drawn from the inductor 111b.

In FIG. 1, the capacitor 118, the diode 115, and the inductor 111b are used to form a path for electric current flowing in one direction in the inductor 111b and drive a voltage output; and the diode 117, the capacitor 119 and the inductor 111b are used to form another path for electric current flowing in another direction in the inductor 111b.

In FIG. 1, the rectified output voltages $V_1$ and $V_2$ are connected in serial to provide the output voltage $V_{out}$ of the convert.

In one embodiment, the inductor 111b has a 1:n ratio to inductor 111a, resulting in a second boost voltage 103, $V_2$, which has the same 1:n ratio to the first boost voltage 103, $V_1$, which was the nominal output voltage. Since the two inductors 111a and 111b are coupled, electric current is taken out of the core 111c both during conduction and during flyback of the transistor 112 (when the transistor 112 is switched off), resulting in much less ripple on the output voltage and in much better use of the flux capabilities of core 111c.

The converter 100 can be used as a highly reliable, low-cost add-on to solar panels and other energy sources, such as water- or wind-generators, fuel cells, etc.

Although FIG. 1 illustrates the use of a half bridge rectifier circuit to generate a direct current output from the inductor 111b, other types of known rectifier circuits can also be used.

Figure 2:
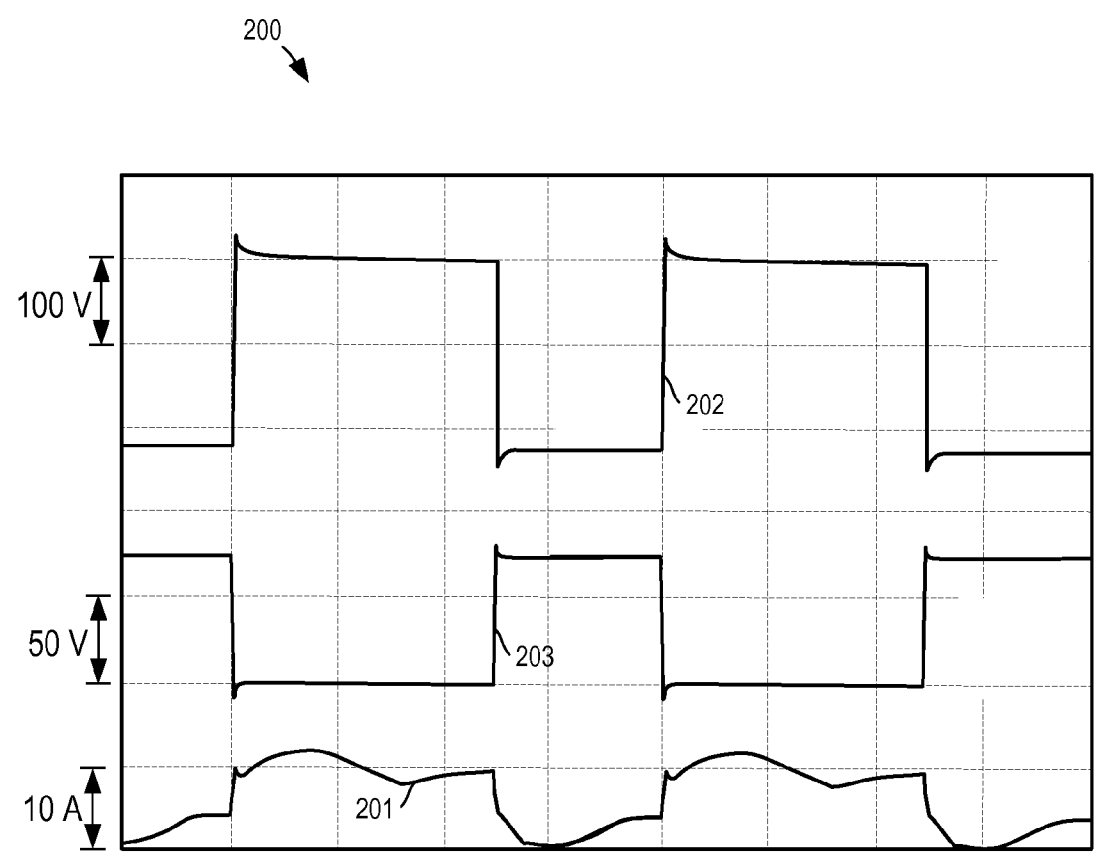
FIGS. 2-3 illustrate waveforms in various locations in the converter illustrated in FIG. 1.
Figure 3:
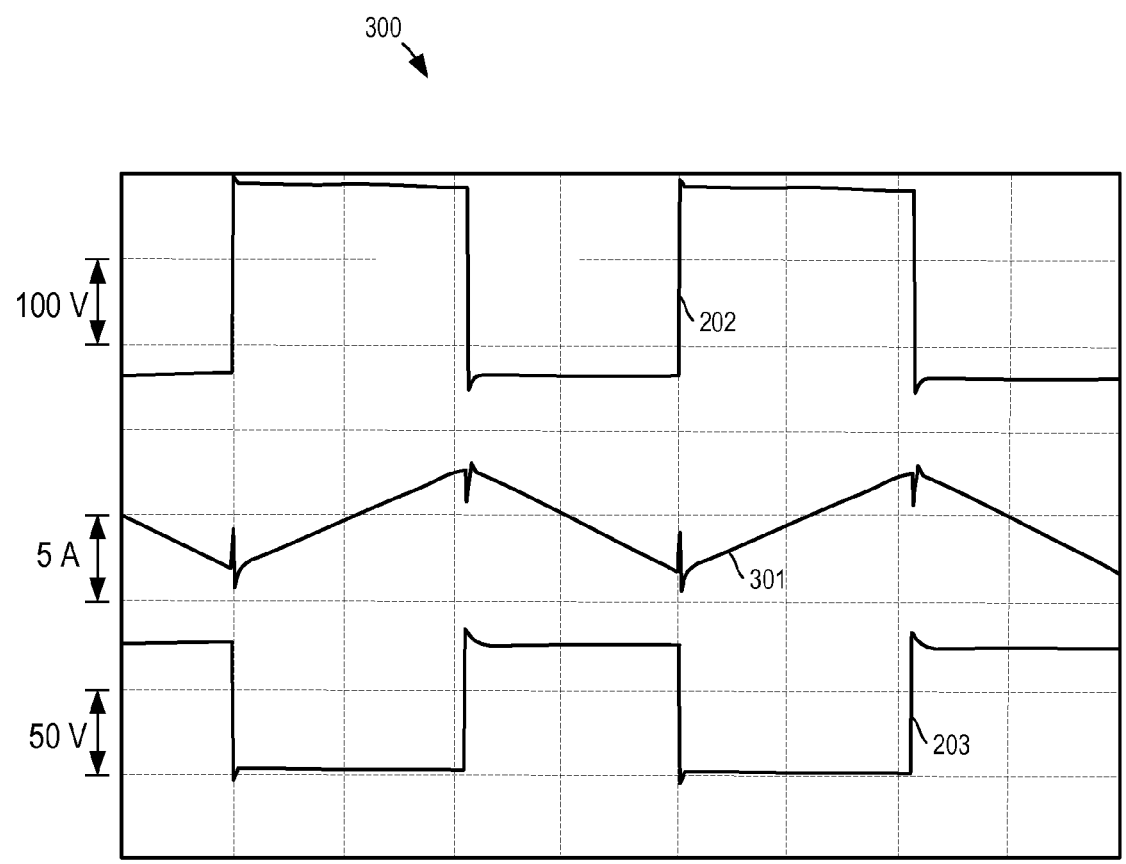

FIGS. 2-3 illustrate waveforms at various locations in the converter illustrated in FIG. 1.

The input current at the point 201 in FIG. 1, after the input filter capacitor 110 and before the inductor 111a, is illustrated as the waveform 201 in FIG. 2. The drain voltage on the transistor 112 at the point 203 in FIG. 1 is illustrated as the waveform 203 in FIGS. 2 and 3. The output rectifier voltage across diode 115 at the point 202 in FIG. 1 is illustrated as the waveform 202 in FIGS. 2 and 3.

In FIG. 3, the electric current measured at the points 201 and 310 in FIG. 1 are combined and illustrated as one waveform 301, which shows the core current adjusted for the ratio of inductor 111b and 111a, coupled with core 111c. The waveform 301 of electric current can be measured using an n-factor current probe at the point 310 in FIG. 1 and the standard current probe at the point 201 in FIG. 1, thus allowing compensation for the higher voltage of 111b.

In the example illustrated in FIG. 2, the nominal input voltage $V_{in}$ is 30 volts; the nominal output voltage $V_{out}$ is 300 volts; the nominal output power is 180 watts.

The resulting simplicity of the circuit for the converter 100 is very interesting. In many cases, a simple square wave may be used, because the output voltage is very stable and it does not necessarily require regulation. However, in some cases the control circuitry (not shown in FIG. 1) for supplying the control voltage 116 is not merely a simple square wave; rather, it may have a fine tuning adjustment to fine tune the output voltage 102, according to certain load situations. For example, negative impedance may be desired in some cases to make the bus more stable; or, current fallback for short circuits situations, etc., may also be desired and may be added using known control technologies for control circuitry (not shown in FIG. 1) that supplies the control voltage 116. Control voltage 116 could be even controlled by a simple microprocessor, because the square wave frequency may be relatively low. The frequency mainly depends on the inductor flux capabilities, etc. Since the circuit illustrated in FIG. 2 has very few components, the diode 113 and transistor 112 are low-voltage components, and the switching speed is relatively slow, no expensive components are needed. Thus, the converter 100 permits building a circuitry very inexpensively and integrating it easily into a solar panel or other device designed for field use.

In one aspect, for example, the input voltage or voltage range is defined to calculate the turn ratio. In the case of the exemplary embodiment discussed above, the input voltage would be 16 to 50 volts. Then a suitable boost-voltage $V_1$ measured at the cathode of diode 113 is selected. This selection is affected by such considerations as component ratings, duty cycle, input voltage range, etc. In this example, 100V components allow $V_1$ to reach safely 75V. This approach also achieves a duty cycle of approximately 50 percent for best transformer operation. In this example, the duty cycle would be approximately 53 percent at 35V. The turn ratio N may then be determined according to the desired output voltage $V_{out}$. It can be calculated based on $V_{out}=V_1/(N+1)$. In this example with N=3 it follows that $V_{out}=V_1+3\,V_1$. If $V_1$ is 75V, then $V_{out}=300V$.

As illustrated in FIG. 3, the inductor total current is identical to that of a regular boost converter. Current changes ΔI calculation is chosen such that peak inductor current is lower than 1.5×I on average (ΔI<$I_{avg}$). Average current $I_{avg}=P_{in}$(max)/$V_{in}$(min), where $P_{in}$(max) is the maximum input power (e.g., 200W/30V=6.7A). In this example, ΔI≈6Ap-p. At ΔI=6A, the inductivity of the transformer L≈60 µH. Further L=$T_{on}$×$V_{in}$/ΔI=12 µS×30/6=60 µH, which may be calculated in an iterative cycle, that means ΔI, inductor value and final number of turns number of turns per layer and outputs location on the transformer may not come at first iteration. In one embodiment, the core 111c has 1 mm gap. For example, one can use an air gap instead but to make it simpler, it is easier to specify the shelf air gap.

Peak current=$I_{in}$(avg)+0.5 ΔI=6.7 A+3 A<10 A. For these conditions AL of 400 nH/$T^2$ a potcore with 42×29 mm dimensions can be chosen. A sandwich construction of layers is recommended for performance. In one embodiment, the following arrangement is used: three sets of primary 13T, secondary 13T, with all primary windings in parallel connection and all secondary in serial connection. In one embodiment, primary is 38#×60 litz wire; and secondary is 38#×40 litz wire.

The forward boost versus regular boost has additional current during ON, and the inductor discharge reflected to the input filter is smaller by 1/N than regular boost. Therefore the RMS ripple current behaves according to $\sqrt{D}.C\times I_{in}$(average). Capacitors can be chosen according to this requirement. In this example, 3>10 µF/100V are used. For example, in a worst case we assume all ripple current flows through input filter capacitor and capacitor rated to handle this current. Therefore, $I_{rms}=\sqrt{\Delta 0.6}\times 6.7\approx 5.2$ A; each cap can handle 3 A RMS.

As a result of the high voltage output, current is comparably low and $I_{out}$(rms)<$I_{out}$(av). In this example, 2 µF per "branch" covers the filtering needs. Additional capacitance and filtering may be needed as a result of the application.

The advantages of the circuit as illustrated in FIG. 1 are numerous. The switching transistor 112 can be implemented by low voltage (100V), similar to a transistor based on trench technology. The diode 113 can be implemented by a 100V Schottky diode. The operation duty cycle can be set around 50 percent, allowing stable control operation versus a conventional boost performing the same function and other topologies. Wave forms are well clamped, avoiding energy losses and the need for snubbers and stress that cause reliability loss. Switching losses are minimal (about quarter in comparison to regular boost). Over all part count is small; and the circuit works with average mode control and a wide input voltage range.

In some cases, the current waveform is not ramp, so peak current mode can not work only voltage mode or average current mode. Peak pulse current limit can function but as protection only. Because it is a boost type the converter 100 can have large input voltage range.

The converter 100 has various applications, including middle power rating for conversion of Photovoltaic (PV) voltage to bus voltage (e.g., 200V), or any topology that needs a conversion ratio of input to output higher then 1:8. Another application is a situation where input current is limited (e.g., as in Photovoltaic modules), or other cases that may need serial current limit protection.

Figure 4:
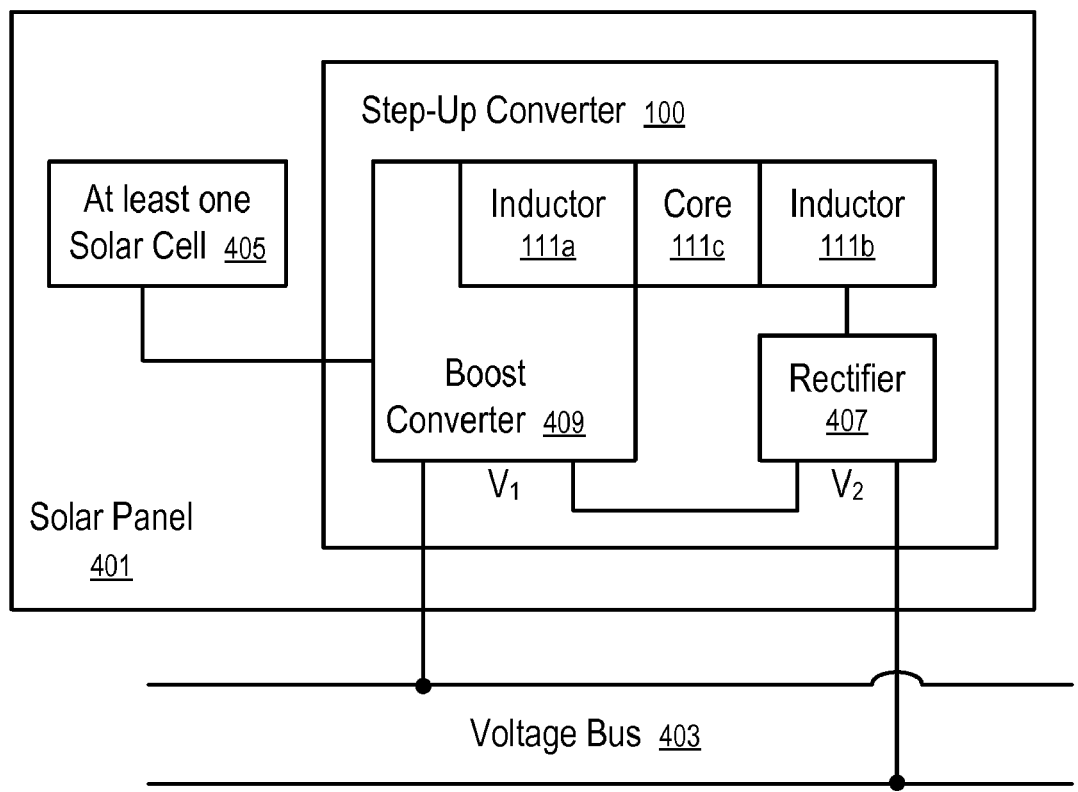
FIG. 4 shows an energy system according to one embodiment.

FIG. 4 shows an energy system according to one embodiment. In FIG. 4, the system includes at least one solar panel 401 connected to a voltage bus 403 that has a voltage above 100 volt (e.g., at 200V). At least one solar cell 405 and a step-up converter 100 are integrated on the solar panel. The solar cell 405 is connected to the boost converter 409, which has a first inductor 111a to generate a first voltage $V_1$. The first inductor 111a and a second inductor 111b are inductively coupled via the core 111c. The rectifier 407 is coupled to the second inductor 111b to generate a second voltage $V_2$. The first voltage $V_1$ generated from the booster converter 409 and the second voltage $V_2$ generated from the rectifier 407 are connected in serial to power the voltage bus 403.

In one embodiment, the booster converter 409 is implemented using a trench transistor 112, a Schottky diode 113 and the inductor 111, as illustrated in FIG. 1.

In one embodiment, the rectifier 407 is implemented using a half bridge rectifier having diodes 115 and 117 and capacitors 118 and 119, as illustrated in FIG. 1.

In one embodiment, the booster converter 409 further includes filters, such as those implemented using capacitors 110 and 114 as illustrated in FIG. 1.

Figure 5:
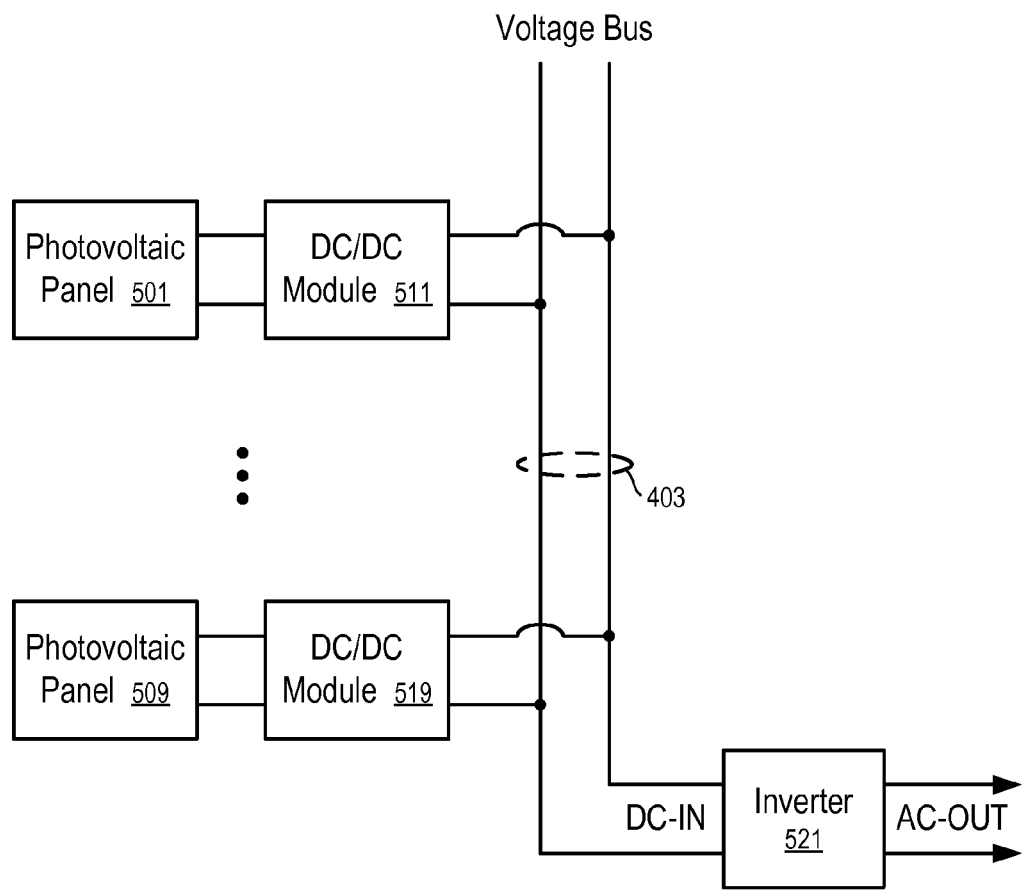
FIG. 5 shows a system with a high voltage bus to connect photovoltaic panels to an alternating current system according to one embodiment.

FIG. 5 shows a system with a high voltage bus to connect photovoltaic panels to an alternating current system according to one embodiment. In FIG. 5, multiple photovoltaic panels (e.g., 501-509) are connected to corresponding DC-to-DC modules (e.g., 511-519). The output of the DC-to-DC modules is connected to a bus 403 that feeds into an inverter 521, which generates AC (Alternating Current) output based in the DC (Direct Current) input received from the bus (403). The DC-to-AC inverter 521 may supply energy to a power grid connection point.

In one embodiment, the DC-to-DC module (e.g., 511) includes a step up converter 100, as illustrated in FIG. 1. In one embodiment, the DC-to-DC module (e.g., 511) may be integrated within the solar panel (401) as illustrated in FIG. 4.

In one embodiment, the DC-to-DC modules (e.g., 511-519) are used to control the voltage on the bus. For example, the control voltage 116 at the transistor 116, shown in FIG. 1, can be controlled via a controller or a microprocessor (not shown in FIG. 1) to stabilize the voltage output to the voltage bus, even when the energy and/or voltage generated by the photovoltaic panels vary in a wide range (e.g., due to difference in the availability of sun light during different times of a day and different days of a year).

Figure 6:
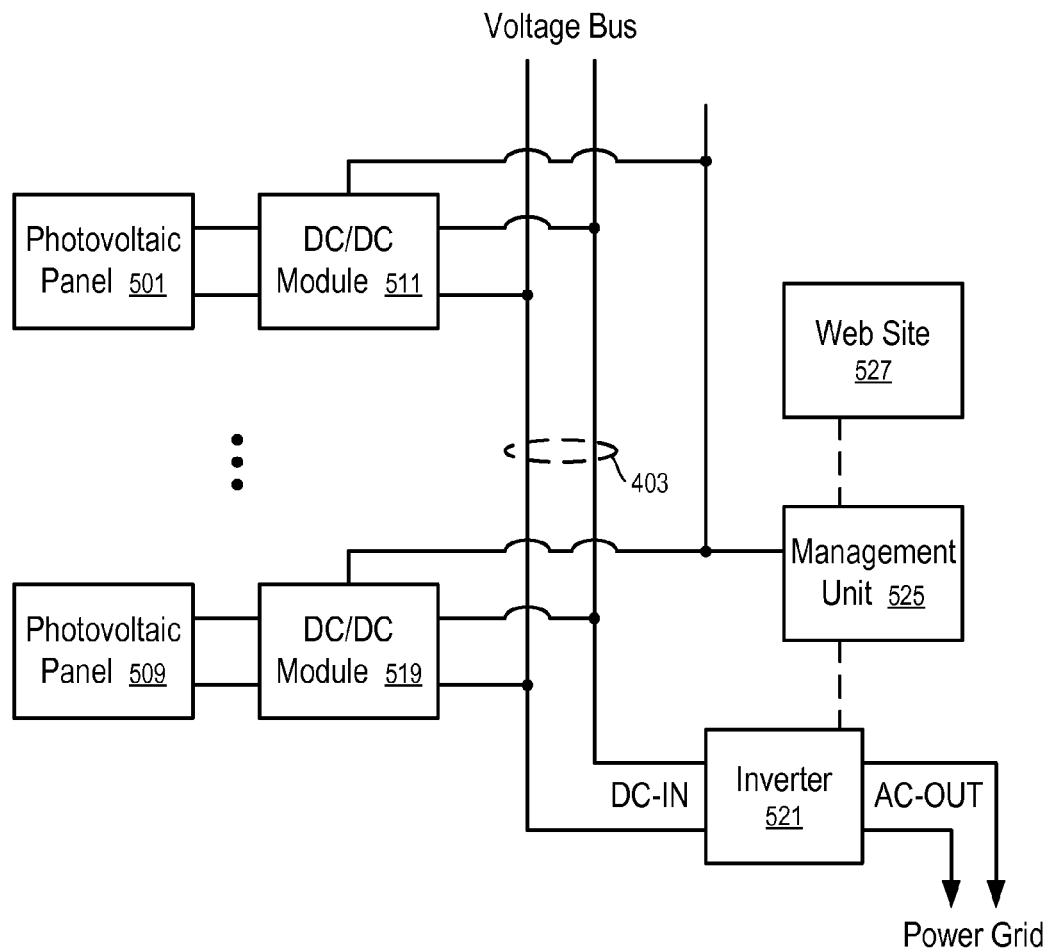
FIG. 6 shows another system with a high voltage bus to connect photovoltaic panels to a power grid according to one embodiment.

FIG. 6 shows another system with a high voltage bus to connect photovoltaic panels to a power grid according to one embodiment. In FIG. 6, a management unit 525 is used to control the voltage on the bus 403. The management unit 525 may have connections to the DC modules 511-519 to control the operation of the step up converters in the DC-to-DC modules 511-519 (e.g., via the controller or microprocessor of the step up converter that controls its output voltage). The communications between the management unit 525 and the DC-to-DC modules may be over a separate cables (as illustrated in FIG. 6), or via a wireless network (e.g., Wi-Fi), or via modulation on the voltage bus 403. For example, the communication signals may be superimposed on the voltage on the voltage bus 403. The voltage swing caused by the communication signals is negligible for the DC-to-AC voltage conversion operation in the inverter 521. In some embodiments, the management unit 525 is implemented as part of the inverter 521, or combined with the DC-to-DC module 519, or implemented as a stand alone unit.

In some cases, the management unit 525 may further communicate with the inverter 521, to adjust the operation state of the inverter 521 to limit the voltage change on the voltage bus 403. In some cases, the management unit 525 can also communicate with additional telemetry and web server applications, such as a web site 527. For example, a user may use the web site to control the nominal voltage on the voltage bus, via the management unit 525. Other features of the management unit 525, as described in U.S. patent application Ser. No. 11/875,799, filed Oct. 19, 2007 and entitled "Method and system to provide a distributed local energy production system with high-voltage DC bus" and incorporated herein by reference, can also be implemented in various embodiments.

In one embodiment, a clear definition of the operating voltage of the bus 403 is provided to coordinate the operations of the multitude of DC-to-DC modules 511-519. Each of the DC-to-DC modules 511-519 is configured to supply an optimal voltage to stabilize the voltage on the voltage bus 403. The bus 403 has an nominal operation voltage and is configured to operation with a narrow range that includes the nominal operation voltage. In one embodiment, the narrow range is within 4 percent of the nominal operation voltage of the bus. In other embodiments, the narrow range may be between 0.1 percent of the nominal operation voltage of the bus 403 and 10 percent of the nominal operation voltage of the bus 403, such as 3.5 percent of the nominal operation voltage of the bus 403, based on the trade off between performance goals and cost for the components.

Keeping the operation voltage of the bus 403 and thus the input voltage of the inverter 521 in a narrow range keeps the cost of the inverter 521 down and its efficiency up, typically by requiring fewer components and lesser safety margins, etc.

Figure 7:
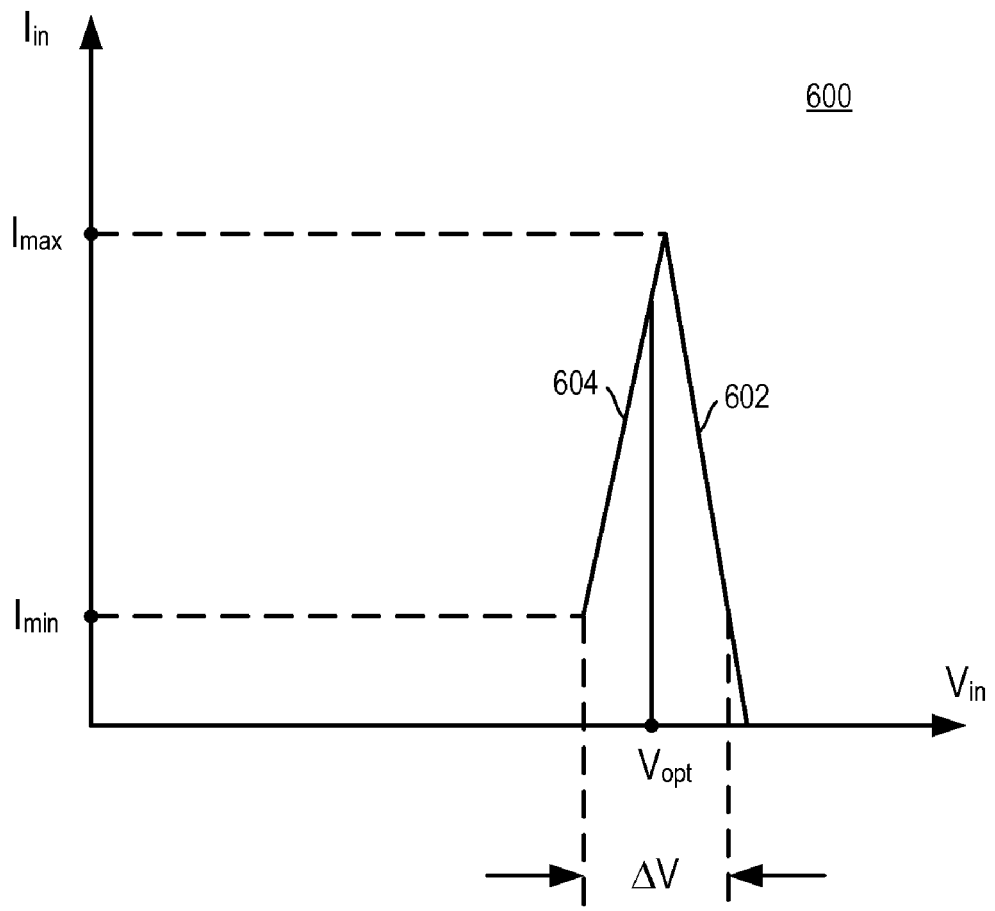
FIG. 7 shows a characteristic of an inverter used in a high voltage bus according to one embodiment.

FIG. 7 shows a characteristic of an inverter used in a high voltage bus according to one embodiment. In one embodiment, the inverter 521 used on the high voltage bus 403 has a characteristic to further stable the voltage on the bus. As illustrated in the voltage current diagram 600 for the inverter 521 in FIG. 7, the inverter 521 can drastically reduce the input current $I_{in}$ it draw from the high voltage bus 403, when the input voltage $V_{in}$ is reduced. For example, when the input voltage is reduced from the optimal operation point $V_{opt}$, the input current $I_{in}$ is reduced rapidly along the line or curve 604. Thus, the inverter will not cause the operating voltage of the bus 403 to move outside the predetermine voltage range for operation, when the energy and/or voltage supplied from the photovoltaic panels changes in a wide range due to the change of available sun light.

In one embodiment, the current $I_{min}$ corresponds to the current consumed by the operation of the inverter 521. Thus, when the input current is reduced to $I_{min}$, the inverter 521 provides no substantial output to the grid.

In one embodiment, the inverter 521 also drastically reduces the current drawn from the high voltage bus 403, along the line or curve 602, when the input voltage increases, to protect the system from overloading.

Thus, the inverter 521 is designed to operate at a narrow voltage range $\Delta V$.

In one embodiment, the input current reaches a peak at $I_{max}$, when the input voltage reaches $1.03 \times V_{opt}$ (3 percent above the optimal voltage). The input current is reduced to avoid a rise of the voltage.

In one embodiment, the inverter 521 has a very steep, Zener like characteristic, resembling a Zener diode, which allows the inverter 521 to increase power (and thus current) dramatically as the voltage increases only slightly, to avoid reduction of the current, as indicated by steep slope 604, where over 99 percent of current rise is achieved over a minimal dynamic range of less than about three percent of voltage. Depending on the voltage losses between individual DC-to-DC modules 511-519 and tolerances allowed in the individual DC-to-DC modules 511-519, the voltage range may be even tighter, resulting in even better efficiency. That tight voltage range allows the individual DC-to-DC modules 511-519 to operate mostly as current sources, overcoming issues with wiring losses, etc. The three percent range is selected based on easily achievable tolerances and manageable losses, but could be anywhere from 0.01 percent to about 10 percent, typically.

Figure 8:
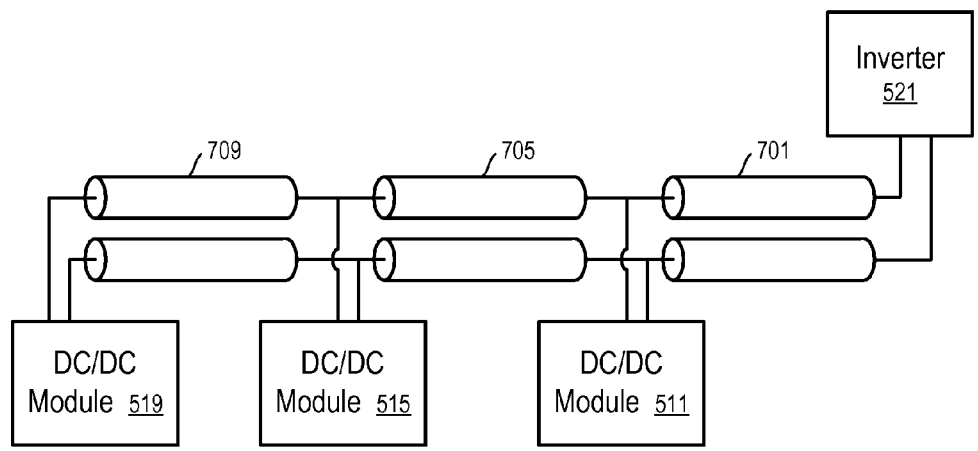
FIGS. 8-9 illustrate ways to connect DC-to-DC modules to an inverter according to various embodiments.
Figure 9:
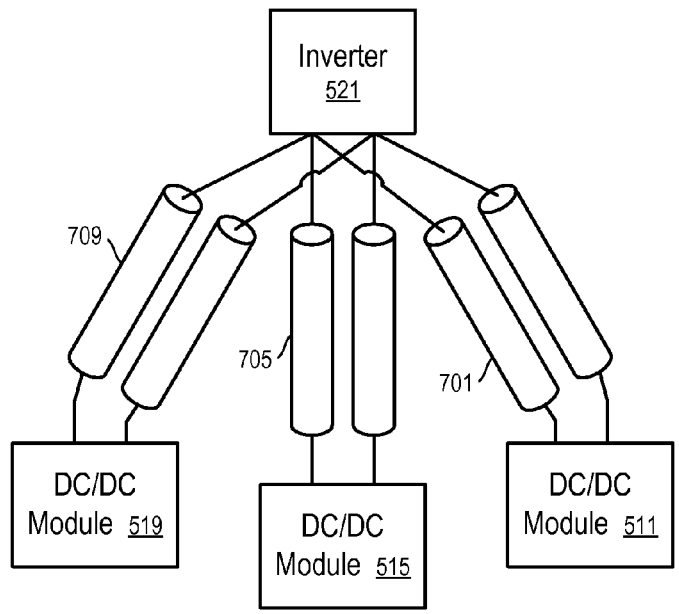

FIGS. 8-9 illustrate ways to connect DC-to-DC modules to an inverter according to various embodiments. In FIG. 8, a daisy-chain bus is used; in FIG. 9, individual connections 701, 705, 709 lead to the vicinity of the inverter 521 in a star shape. These connection wires 701, 705, 709 have some resistance. As long as the voltage drop within the wires remains under the voltage dynamic range of the inverter 521 noted in the discussion of FIG. 7, there should be no operational problems, as the voltage should continue to flow.

In some embodiments, the DC-to-DC modules 511-519 are connected to the inverters directly. Alternatively, the DC-to-DC modules 511-519 can be connected to the inverter as part of a mesh network or combiner boxes, or fuse boxes.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system, comprising:
    a plurality of direct current modules having variable direct current inputs and each module having a step up converter;
    an inverter; and
    a direct current bus connecting the direct current modules to the inverter, the modules and the bus together being configured to operate at a nominal operating voltage higher than 100 volts and to operate within 10 percent of the nominal operating voltage.

2. The system of claim 1, wherein each of the direct current modules comprises a controller to control a voltage output to the bus.

3. The system of claim 2, further comprising:
    a management module coupled to the bus and the plurality of direct current modules, the management module being configured to communicate with the direct current modules to control the output voltage on the bus.

4. The system of claim 3, wherein the management module is further coupled to the inverter to control the voltage on the bus.

5. The system of claim 4, wherein the management module is further connected to a web site to receive instructions to control the voltage on the bus.

6. The system of claim 5, wherein the direct current modules are coupled with photovoltaic panels to increase output voltages from the photovoltaic panels.

7. The system of claim 6, wherein the inverter is coupled to a power grid.

8. The system of claim 1, wherein the inverter has a Zener characteristic.

9. The system of claim 1, wherein the inverter represents a shunt regulator toward the bus.

10. The system of claim 1, wherein the direct current modules are connected to the bus in a daisy chain.

11. The system of claim 1, wherein the direct current modules are connected to a vicinity of the inverter in a star form for connection to the inverter.

12. The system of claim 1, wherein the step up converter in each of the direct current modules comprises:
    a boost converter having a first inductor;
    a second inductor paired on a core with the first inductor; and
    a half bridge rectifier circuit coupled with the second inductor to generate a direct current output to the bus.

13. The system of claim 12, wherein the boost converter further comprises a transistor to implement a switch in the boost converter and a controller coupled to the transistor to control the switch to adjust an output voltage of the step up converter.

14. The system of claim 12, wherein the boost converter provides a first portion of a voltage output of the step-up converter; and the rectifier circuit provides a second portion of the voltage output of the step-up converter.

15. The system of claim 14, wherein the first portion and the second portion of the voltage output of the step-up converter are proportional to a ratio between the first inductor and the second inductor.

16. The system of claim 14, wherein the boost converter further comprises a transistor to implement a switch in the boost converter, the voltage output of the step-up converter being higher than 100 volts, and the transistor having a breakdown voltage lower than 100 volts.

17. The system of claim 16, wherein resistance between drain source connection in the transistor is less than ten milliohms when the transistor is in a saturated on mode.

18. The system of claim 12, wherein outputs of the boost converter and the rectifier circuit are connected in serial.

19. An energy system, comprising:
    a direct current bus;
    a plurality of photovoltaic panels;
    a plurality of direct current modules each including a step up converter and wherein the modules are coupled between the plurality of photovoltaic panels and the bus; and
    an inverter coupled between the bus and a power grid, wherein the direct current modules and the bus are configured together to operate at a nominal voltage higher than 200 volts and to operate within 4 percent of the nominal voltage of the bus even when a current supplied by the photovoltaic panels is reduced to a level to power the inverter without substantial output to the power grid.

20. The system of claim 19, wherein the inverter has a characteristic that resembles a Zener diode.

* * * * *